3,080,385
3α,4α AND 5β,6β-CYCLOPROPANO-
PREGNENE DERIVATIVES
Lawrence H. Knox, Mexico City, Mexico, assignor to
Syntex S.A., Mexico City, Mexico, a corporation of
Mexico
No Drawing. Filed Apr. 13, 1962, Ser. No. 187,201
20 Claims. (Cl. 260—397.1)

The present invention relates to novel cyclopentano-phenanthrene derivatives and to a process for the production thereof.

More particularly the present invention relates to novel 3α,4α - (cyclopropano)-Δ⁵-pregnene-11β,17α,21-triol-20-one; 5β,6β - cyclopropano)-Δ³-pregnene-11β,17α,21-triol-20-one derivatives and to the corresponding 11-keto derivatives thereof.

The novel compounds of the present invention are represented by the following formulas:

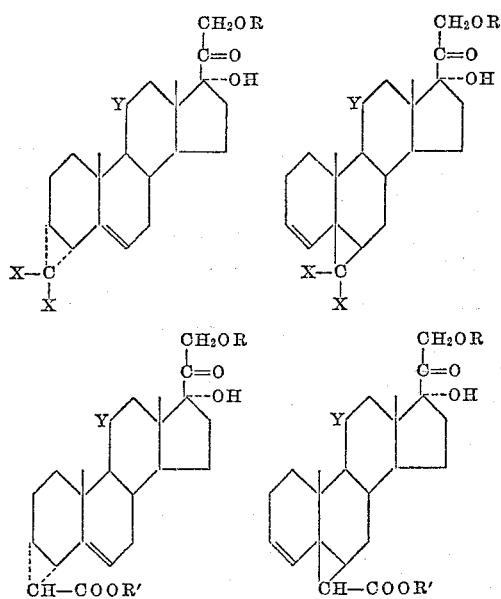

In the above formulas X represents hydrogen, fluorine or chlorine; Y represents a keto group or a β-hydroxyl; R represents hydrogen or a hydrocarbon carboxylic acyl group of less than 12 carbon atoms; and R¹ represents hydrogen or a lower alkyl group.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formulas possess anti-androgenic, anti-estrogenic, anti-gonadotrophic, anti-inflammatory and glycogenic properties.

The novel compounds of the present invention are prepared by the process exemplified as follows:

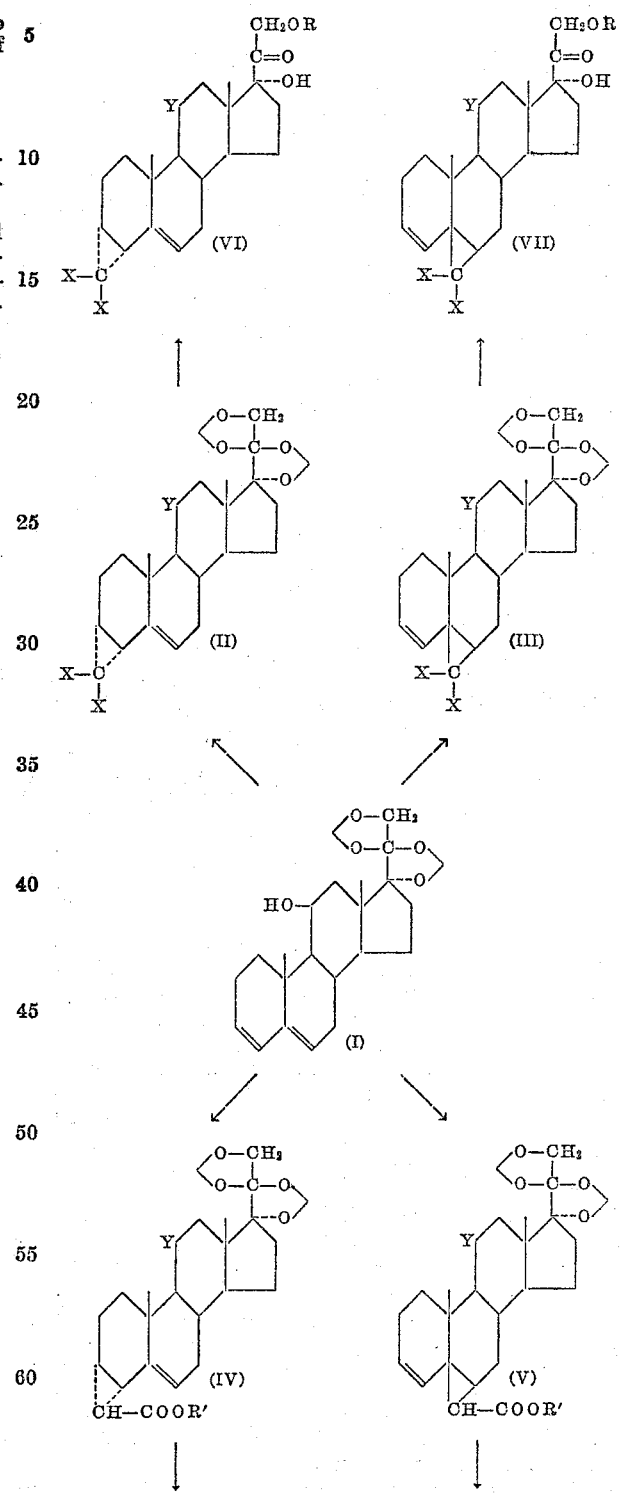

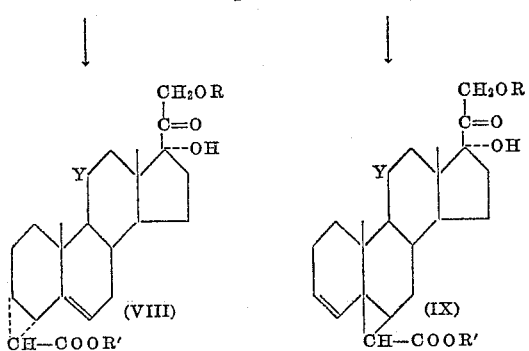

In the above formulas X, Y, R and R¹ have the same meaning as set forth hereinbefore.

The starting compound (I) of the process just outlined, is 17,20;20,21 - bismethylenedioxy-Δ³,⁵-pregnadien-11β-ol and is prepared from hydrocortisone by conventional treatment with formaldehyde in the presence of hydrochloric acid, reduction of the resulting 17,20;20,21-bismethylenedioxy-Δ⁴-pregnen-11β-ol-3-one, preferably with lithium aluminum hydride and finally refluxing the obtained 17,20;20,21-bismethylenedioxy-Δ⁴-pregnen-3β,11β-diol with 50% acetic acid.

In carrying out the process illustrated above, the starting compound (I) is treated with an alkali metal trichloroacetate, preferably sodium trichloroacetate, in a suitable solvent such as bis-(2-methoxyethyl) ether at approximately 125° C. for a period of time of the order of 1.5 hours and the product thus obtained is chromatographed, for example on Florisil, thus affording 17,20;20,21-bismethylenedioxy-1',1'-dichlorocyclopropano - (2',3'; 3α,4α)-Δ⁵-pregnen-11β-ol (II: X=Cl, Y=β-OH) and 17,20;20,21-bismethylenedioxy - 1',1' - dichlorocyclopropano-(2',3';5β,6β)-Δ³-pregnen-11β-ol (III: X=Cl, Y=β-OH).

Upon treatment of the starting compound (I) with diazomethane in the presence of copper powder followed by chromatography of the resulting product, there are obtained 17,20;20,21 - bismethylenedioxycyclopropano-(1',2';3α,4α)-Δ⁵-pregnen-11β-ol (II: X=H, Y=β-OH) and 17,20;20,21-bismethylenedioxy-cyclopropano - (1',2'; 5β,6β)-Δ³-pregnen-11β-ol (III: X=H, Y=β-OH).

Upon reaction of the starting compound (I) with an alkali metal monochlorodifluoroacetate, preferably sodium monochlorodifluoroacetate, in a suitable solvent such as diglyme, at reflux temperature, for a period of time of the order of 20 minutes, followed by chromatography of the resulting product, there are produced 17,20;20,21-bismethylenedioxy-1',1'-difluorocyclopropano - (2',3';3α,4α)-Δ⁵-pregnen-11β-ol (II: X=F, Y=β-OH) and 17,20;20,21-bismethylenedioxy-1',1'-difluorocyclopropano - (2',3';5β, 6β)-Δ³-pregnen-11β-ol (III: X=F, Y=β-OH).

The reaction of the starting compound (I) with a lower alkyl diazoacetate such as ethyl diazoacetate, in the presence of copper powder in a suitable solvent such as 1,2-dimethoxy-ethane, at reflux temperature and for a period of time of the order of 4.5 hours, yields a product which upon chromatography is separated into 17,20;20,21-bismethylenedioxy - 1' - carbethoxycyclopropano - (2',3';3α, 4α)-Δ⁵-pregnen-11β-ol (IV: Y=β-OH, R¹=ethyl) and 17,20;20,21-bismethylenedioxy - 1' - carbethoxycyclopropano - (2',3';5β,6β) - Δ³ - pregnen-11β-ol (V: Y=β-OH, R¹=ethyl). Conventional saponification of the latter compounds with a base, affords the corresponding 1'-carboxycyclopropane derivatives (IV, V: R¹=H).

The above described 11β-alcohols (II, III, IV, V: =β-OH) are oxidized, preferably with chromic acid, to the corresponding 11-ketones (II, III, IV, V: Y=O).

All the above compounds which have a 17,20; 20,21-bismethylenedioxy grouping, are conventionally hydrolyzed in an acid medium such as 60% formic acid, to give the corresponding 17α,21-diol-20-one derivatives (VI, VII, VIII, IX: R=H).

The 21-hydroxyl of the obtained free 17α,21-diol-20-one derivatives is conventionally acylated in pyridine, thus giving the corresponding 21-acylates (VI, VII, VIII, IX: R=acyl).

The following specific examples serve to illustrate but are not intended to limit the scope of the present invention:

PREPARATION 1

To a solution of 5 g. of hydrocortisone in 200 cc. of chloroform were added 40 cc. of 37% aqueous formaldehyde and 5 cc. of concentrated hydrochloric acid and the mixture was stirred for 48 hours at room temperature. The two layers were separated; the aqueous layer was washed with chloroform and the combined organic solutions were washed with water to neutral, dried over anhydrous sodium sulfate and evaporated to dryness. The residue was recrystallized from methanol-ether thus affording 17,20;20,21-bismethylenedioxy - Δ⁴ - pregnen-11β-ol-3-one.

A solution of 4 g. of the latter compound in 250 cc. of tetrahydrofuran was added over a 30 minute period to a stirred suspension of 4 g. of lithium aluminum hydride in 250 cc. of anhydrous tetrahydrofuran. The mixture was refluxed for 2 hours, then cooled and cautiously treated with 15 cc. of ethyl acetate and 8 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 17,20;20,21 - bismethylenedioxy-Δ⁴-pregnen-3β,11β-diol.

1 g. of 17,20;20,21-bismethylenedioxy-Δ⁴-pregnene-3β, 11β-diol was heated on the steam bath with 100 cc. of 50% acetic acid under nitrogen for 1 hour, it was then concentrated under vacuum to a small volume and poured into water. The precipitate was collected, washed well with water, dried and recrystallized from acetonehexane, thus furnishing 17,20;20,21-bismethylenedioxy-Δ³,⁵-pregnadien-11β-ol.

*Example I*

To a solution of 2 g. of 17,20;20,21-bismethylenedioxy-Δ³,⁵-pregnadien-11β-ol in 50 cc. of diglyme [bis(2-methoxyethyl)ether] at 125° C. there were added 4.4 g. of sodium trichloroacetate in 10 equal portions at 10 minute intervals. The reaction mixture was then cooled; the formed sodium chloride filtered off and the filtrate evaporated to dryness under reduced pressure. The residue was conventionally chromatographed on Florisil, thus yielding two products, which upon crystallization from methanol furnished 17,20;20,21-bismethylenedioxy-1',1'-dichlorocyclopropano - (2',3';3α,4α) - Δ⁵ - pregnen-11β-ol and 17,20;20,21 - bismethylenedioxy - 1',1'-dichlorocyclopropano-(2',3';5β,6β)-Δ³-pregnen-11β-ol.

*Example II*

To a mixture of 2 g. of 17,20; 20,21-bismethylenedioxy-Δ³,⁵-pregnadien-11β-ol, 50 cc. of ether and 300 mg. of powdered copper there was cautiously added a large excess of an ethereal solution of diazomethane, dropwise and with stirring. After evolution of nitrogen had ceased, the mixture was filtered and the excess reagent was decomposed by adding dropwise acetic acid until the yellow color of the filtrate disappeared. The solution was then evaporated to dryness and the residue chromatographed on Florisil, thus yielding two products which upon crystallization from acetone-hexane furnished 17,20;20,21-bismethylenedioxy - cyclopropano-(1',2';3α,4α)-Δ⁵-pregnen-11β-ol and 17,20;20,21-bismethylenedioxy-cyclopropano-(1',2';5β,6β)-Δ³-pregnen-11β-ol.

*Example III*

A mixture of 2 g. of 17,20;20,21-bismethylenedioxy-

Δ³,⁵-pregnadien-11β-ol, 20 cc. of 1,2-dimethoxyethane and 300 mg. of freshly prepared copper powder was heated to reflux temperature, then there was added dropwise with stirring a solution of 3.4 g. of ethyl diazoacetate in 5 cc. of 1,2-dimethoxy-ethane over a period of 2 hours. Refluxing was continued for an additional 2.5 hours. The catalyst was thereafter filtered off and the filtrate evaporated to dryness. The residue was conventionally chromatographed on Florisil, thus yielding two products which upon crystallization from acetone-hexane furnished 17,20; 20,21 - bismethylenedioxy - 1' - carbethoxycyclopropano-(2',3';3α,4α)-Δ⁵-pregnen-11β-ol and 17,20;20,21-bismethyienedioxy-1'-carbethoxycyclopropano - (2',3';5β,6β)-Δ³-pregnen-11β-ol.

*Example IV*

A mixture of 2 g. of 17,20;20,21-bismethylenedioxy-Δ³,⁵-pregnadien-11β-ol, 100 cc. of diglyme and 4 g. of sodium monochlorodifluoroacetate was refluxed for 10 minutes, then cooled to 50° C., an additional 4 g. of the same salt were thereafter added and the resulting mixture again refluxed for 10 minutes. The reaction mixture was cooled, the formed sodium chloride filtered off and the filtrate evaporated to dryness under reduced pressure. The residue was conventionally chromatographed on Florisil, thus yielding two products, which upon crystallization from methanol furnished 17,20;20,21-bismethylenedioxy-1',1'-difluorocyclopropano - (2',3';3α,4α) - Δ⁵-pregnen-11β-ol and 17,20;20,21 - bismethylenedioxy - 1',1'-difluorocyclopropano-(2',3';5β,6β)-Δ³-pregnen-11β-ol.

*Example V*

A solution of 1 g. of 17,20;20,21-bismethylenedioxy-1',1'-dichlorocyclopropano-(2',3';3α,4α) - Δ⁵ - pregnen-11β-ol in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 17,20;20,21-bismethylenedioxy-1',1'-dichlorocyclopropano-(2',3';3α,4α)-Δ⁵-pregnen-11-one.

Following the same procedure, the starting compounds listed under I were converted into the corresponding products set forth under II.

| I | II |
|---|---|
| 17,20;20,21-bismethylene-dioxy-1',1'-dichlorocyclopropano-(2',3';5β,6β)-Δ³-pregnen-11β-ol. | 17,20;20,21-bismethylene-dioxy-1',1'-dichlorocyclopropano-(2',3';5β,6β)-Δ³-pregnen-11-one. |
| 17,20;20,21-bismethylene-dioxy-cyclopropano-(1',2';3α,4α)-Δ⁵-pregnen-11β-ol. | 17,20;20,21-bismethylene-dioxy-cyclopropano-(1',2';3α,4α)-Δ⁵-pregnen-11-one. |
| 17,20;20,21-bismethylene-dioxy-cyclopropano-(1',2';5β,6β)-Δ³-pregnen-11β-ol. | 17,20;20,21-bismethylene-dioxy-cyclopropano-(1',2';5β,6β)-Δ³-pregnen-11-one. |
| 17,20;20,21-bismethylene-dioxy-1'-carbethoxycyclopropano-(2',3';3α,4α)-Δ⁵-pregnen-11β-ol. | 17,20;20,21-bismethylene-dioxy-1'-carbethoxycyclopropano-(2',3';3α,4α)-Δ⁵-pregnen-11-one. |
| 17,20;20,21-bismethylene-dioxy-1'-carbethoxycyclopropano-(2',3';5β,6β)-Δ³-pregnen-11β-ol. | 17,20;20,21-bismethylene-dioxy-1'-carbethoxycyclopropano-(2',3';5β,6β)-Δ³-pregnen-11-one. |
| 17,20;20,21-bismethylene-dioxy-1',1'-difluorocyclopropano-(2',3';3α,4α)-Δ⁵-pregnen-11β-ol. | 17,20;20,21-bismethylene-dioxy-1',1'-difluorocyclopropano-(2',3';3α,4α)-Δ⁵-pregnen-11-one. |
| 17,20;20,21-bismethylene-dioxy-1',1'-difluorocyclopropano-(2',3';5β,6β)-Δ³-pregnen-11β-ol. | 17,20;20,21-bismethylene-dioxy-1',1'-difluorocyclopropano-(2',3';5β,6β)-Δ³-pregnen-11-one. |

*Example VI*

1 g. of 17,20;20,21-bismethylenedioxy-1',1'-dichlorocyclopropano-(2',3';3α,4α)-Δ⁵-pregnen-11β-ol was heated on the steam bath with 20 cc. of 60% formic acid for 1 hour, cooled, diluted with water and the precipitate was collected, washed with water, dried and recrystallized from acetone-hexane, thus affording 1',1'-dichlorocyclopropano-(2',3';3α,4α)-Δ⁵-pregnene - 11β,17α,21 - triol-20-one.

The starting compounds under I were submitted to the same treatment, thus producing the corresponding products under II.

| I | II |
|---|---|
| 17,20; 20,21-bismethylenedioxy-1',1'-dichlorocyclopropano-(2'3';5β,6β)-Δ³-pregnen-11-one. | 1',1'-dichlorocyclopropano-(2',3';5β,6β)-Δ³-pregene-17α,21-diol-11,20-dione. |
| 17,20; 20,21-bismethylenedioxy-cyclopropano-(1',2';3α,4α)-Δ⁵-pregnen-11-one. | cyclopropano-(1',2';3α,4α)-Δ⁵-pregnene-17α,21-diol-11,20-dione. |
| 17,20; 20,21-bismethylenedioxy-cyclopropano-(1',2';5β,6β)-Δ³-pregnen-11-one. | cyclopropano-(1',2';5β,6β)-Δ³-pregnene-17α,21-diol-11,20-dione. |
| 17,20; 20,21-bismethylenedioxy-1'-carbethoxycyclopropano-(2',3';3α,4α)-Δ⁵-pregnen-11-one. | 1'-carbethoxycyclopropano-(2',3';3α,4α)-Δ⁵-pregnene-17α,21-diol-11,20-dione. |
| 17,20; 20,21-bismethylenedioxy-1'-carbethoxycyclopropano-(2',3';5β,6β)-Δ³-pregnen-11-one. | 1'-carbethoxycyclopropano-(2',3';5β,6β)-Δ³-pregnene-17α,21-diol-11,20-dione. |
| 17,20; 20,21-bismethylenedioxy-1',1'-difluorocyclopropano-(2',3';3α,4α)-Δ⁵-prgenen-11-one. | 1',1'-difluorocyclopropano-(2',3';3α,4α)-Δ⁵-pregnene-17α,21-diol-11,20-dione. |
| 17,20; 20,21-bismethylenedioxy-1',1'-difluorocyclopropano-(2',3';5β,6β)-Δ³-pregnen-11-one. | 1',1'-difluorocyclopropano-(2',3';5β,6β)-Δ³-pregnene-17α,21-diol-11,20-dione. |
| 17,20;20,21-bismethylenedioxy-1',1'-dichlorocyclopropano-(2',3';3α,4α)-Δ⁵-pregnen-11-one. | 1',1'-dichlorocyclopropano-(2',3';3α,4α)-Δ⁵-pregnene-11β,17α,21-diol-11,20-dione. |
| 17,20; 20,21-bismethylenedioxy-1',1'-dichlorocyclopropano-(2',3';5β,6β)-Δ³-pregnen-11β-ol. | 1',1'-dichlorocyclopropano-(2',3';5β,6β)-Δ³-pregnene-11β,17α,21-triol-20-one. |
| 17,20; 20,21-bismethylenedioxy-cyclopropano-(1',2';3α,4α)-Δ⁵-pregnen-11β-ol. | cyclopropano-(1',2';3α, 4α)-Δ⁵-pregnene-11β,17α,21-triol-20-one. |
| 17,20; 20,21-bismethylenedioxy-cyclopropano-(1',2';5β,6β)-Δ³-pregnen-11β-ol. | cyclopropano-(1',2';5β,6β)-Δ³-pregnene-11β,17α,21-triol-20-one. |
| 17,20; 20,21-bismethylenedioxy-1'-carbethoxycyclopropano-(2',3';3α,4α)-Δ⁵-pregnen-11β-ol. | 1'-carbethoxycyclopropano-(2',3';3α,4α)-Δ⁵-pregnene-11β,17α,21-triol-20-one. |
| 17,20; 20,21-bismethylenedioxy-1'-carbethoxycyclopropano-(2',3';5β,6β)-Δ³-pregnen-11β-ol. | 1'-carbethoxycyclopropano-(2',3';5β,6β)-Δ³-pregnene-11β,17α,21-triol-20-one. |
| 17,20; 20,21-bismethylenedioxy-1',1'-difluorocyclopropano-(2',3';3α,4α)-Δ⁵-pregnen-11β-ol. | 1',1'-difluorocyclopropano-(2',3';3α,4α)-Δ⁵-pregnene-11β,17α,21-triol-20-one. |
| 17,20; 20,21-bismethylenedioxy-1',1'-difluorocyclopropano-(2',3';5β,6β)-Δ³-pregnen-11β-ol. | 1',1'-difluorocyclopropano-(2',3';5β,6β)-Δ³-pregnene-11β,17α,21-triol-20-one. |

*Example VII*

A mixture of 1 g. of 1',1'-dichlorocyclopropano-(2',3';3α,4α)-Δ⁵-pregnene-11β,17α,21-triol-20-one, 4 cc. of pyridine and 2 cc. of acetic anhydride was kept at room temperature overnight, poured into ice water, the formed precipitate was filtered, washed with water and dried. Crystallization from acetone-hexane gave the 21-acetate of 1',1'-dichlorocyclopropano-(2',3';3α,4α)-Δ⁵-pregnene-11β,17α,21-triol-20-one.

The same conditions were used for the conversion of the rest of the final products of Example VI into the corresponding 21-acetates.

*Example VIII*

The final products of Example VI were treated in accordance with Example VII, except that acetic anhydride was substituted by propionic anhydride and caproic anhydride, thus affording respectively the corresponding 21-propionates and 21-caproates.

*Example IX*

A suspension of 1 g. of 1'-carbethoxycyclopropano-(2',3';3α,4α)-Δ⁵-pregnene-17α,21-diol-11,20-dione in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 1' - carboxycyclopropano - (2',3';3α,4α) - Δ⁵ - pregnene-17α,21-diol-11,20-dione.

1' - carbethoxycyclopropano-(2',3';5β,6β)-Δ³-pregnene-17α,21 - diol - 11,20 - dione, 1'-carbethoxycyclopropano-(2',3';3α,4α)-Δ⁵-pregnene-11β,17α,21-triol-20-one and 1'-carbethoxycyclopropano - (2',3';5β,6β) - Δ3 - pregnene-11β,17α,21-triol-20-one were treated by the same procedure, giving respectively 1'-carboxycyclopropano-(2',3'; 5β,6β)-Δ³-pregnene-17α,21-diol-11,20-dione, 1'-carboxycyclopropano - (2',3';3α,4α) - Δ⁵ - pregnene - 11β,17α,21-triol-20-one and 1'-carboxycyclopropano-(2',3';5β,6β)-Δ³-pregnene-11β,17α,21-triol-20-one.

*Example X*

The final products of Example IX were treated in accordance with Example VII, thus yielding the corresponding 21-acetates.

I claim:
1. A compound of the following formula:

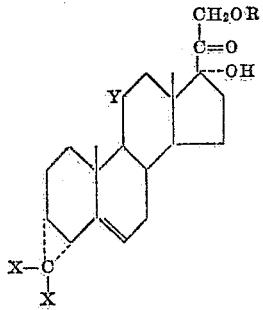

wherein R is selected from the group consisting of hydrogen and a hydrocarbon carboxylic acyl group of less than 12 carbon atoms; X is a member of the group consisting of hydrogen, fluorine and chlorine; and Y is selected from the group consisting of β-hydroxyl and keto.
2. 1',1'-dichlorocyclopropano-(2',3';3α,4α) - Δ⁵ - pregnene-17α,21-diol-11,20-dione.
3. 1',1'-difluorocyclopropano-(2',3';3α,4α) - Δ⁵ - pregnene-17α,21-diol-11,20-dione.
4. 1',1'-difluorocyclopropano-(2',3';3α,4α) - Δ⁵ - pregnene-11β,17α,21-triol-20-one.
5. Cyclopropano-(1',2';3α,4α) - Δ⁵ - pregnene-11β,17α, 21-triol-20-one.
6. A compound of the following formula:

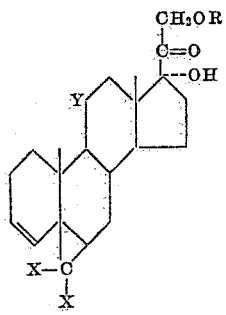

wherein R is selected from the group consisting of hydrogen and a hydrocarbon carboxylic acyl group of less than 12 carbon atoms; X is a member of the group consisting of hydrogen, fluorine and chlorine; and Y is selected from the group consisting of β-hydroxyl and keto.
7. 1',1'-dichlorocyclopropano-(2',3';5β,6β) - Δ³ - pregnene-17α,21-diol-11,20-dione.

8. 1',1'-difluorocyclopropano-(2',3';5β,6β) - Δ³ - pregnene-17α,21-diol-11,20-dione.
9. 1',1'-difluorocyclopropano-(2',3';5β,6β) - Δ³ - pregnene-11β,17α,21-triol-20-one.
10. Cyclopropano-(1',2';5β,6β) - Δ³ pregnene-11β, 17α,21-triol-20-one.
11. A compound of the following formula:

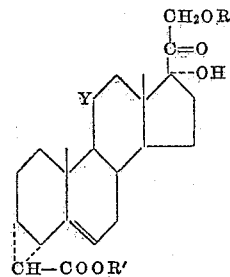

wherein R is selected from the group consisting of hydrogen and a hydrocarbon carboxylic acyl group of less than 12 carbon atoms; R¹ is a member of the group consisting of hydrogen and a lower alkyl group; and Y is selected from the group consisting of β-hydroxyl and keto.
12. 1'-carbethoxycyclopropano - (2',3';3α,4α)-Δ⁵-pregnene-17α,21-diol-11,20-dione.
13. 1'-carbethoxycyclopropano - (2',3';3α,4α)-Δ⁵-pregnene-11β,17α,21-triol-20-one.
14. 1'-carboxycyclopropano - (2',3';3α,4α) - Δ⁵- pregnene-11β,17α,21-triol-20-one.
15. 1'-carboxycyclopropano - (2',3';3α,4α) - Δ⁵ - pregnene-17α,21-diol-11,20-dione.
16. A compound of the following formula:

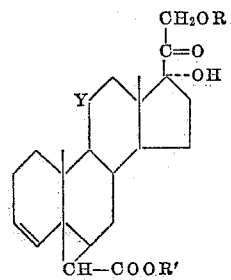

wherein R is selected from the group consisting of hydrogen and a hydrocarbon carboxylic acyl group of less than 12 carbon atoms; R¹ is a member of the group consisting of hydrogen and a lower alkyl group; and Y is selected from the group consisting of β-hydroxyl and keto.
17. 1'-carbethoxycyclopropano - (2',3';5β,6β)-Δ³-pregnene-17α,21-diol-11,20-dione.
18. 1'-carbethoxycyclopropano - (2',3';5β,6β)-Δ³-pregnene-11β,17α,21-triol-20-one.
19. 1'-carboxycyclopropano - (2',3';5β,6β) - Δ³ - pregnene-11β,17α,21-triol-20-one.
20. 1'-carboxycyclopropano - (2',3';5β,6β) - Δ³ - pregnene-17α,21-diol-11,20-dione.

No references cited.